US009835190B2

(12) United States Patent
Landsberg et al.

(10) Patent No.: US 9,835,190 B2
(45) Date of Patent: Dec. 5, 2017

(54) STUD CLIP INSERT FOR PANEL HOLE

(71) Applicant: GM GLOBAL TECHNOLOGY OPERATIONS LLC, Detroit, MI (US)

(72) Inventors: Ethan Landsberg, Troy, MI (US); Jeremy P. Fellows, Davisburg, MI (US); Randall L. Johnson, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 37 days.

(21) Appl. No.: 15/091,178

(22) Filed: Apr. 5, 2016

(65) Prior Publication Data

US 2017/0284437 A1    Oct. 5, 2017

(51) Int. Cl.
| F16B 19/00 | (2006.01) |
| F16B 5/06 | (2006.01) |
| F16B 21/07 | (2006.01) |
| F16B 37/04 | (2006.01) |
| F16B 37/08 | (2006.01) |

(52) U.S. Cl.
CPC .......... *F16B 5/0642* (2013.01); *F16B 21/075* (2013.01); *F16B 37/043* (2013.01); *F16B 37/0842* (2013.01)

(58) Field of Classification Search
CPC ........ F16B 5/02; F16B 5/0208; F16B 5/0642; F16B 21/075; F16B 21/078; F16B 37/043; F16B 37/0842; F16B 19/00
USPC .......................................... 411/432, 437, 508
See application file for complete search history.

(56) References Cited

U.S. PATENT DOCUMENTS

| 2,727,552 | A |   | 12/1955 | Chvosta |              |
|-----------|---|---|---------|---------|--------------|
| 4,579,493 | A | * | 4/1986  | Schaty  | F16B 37/0842 |
|           |   |   |         |         | 24/104       |
| 4,728,236 | A | * | 3/1988  | Kraus   | F16B 37/0842 |
|           |   |   |         |         | 24/662       |
| 4,927,306 | A |   | 5/1990  | Sato    |              |
| 5,291,639 | A | * | 3/1994  | Baum    | F16B 5/128   |
|           |   |   |         |         | 24/289       |
| 5,297,322 | A | * | 3/1994  | Kraus   | F16B 21/073  |
|           |   |   |         |         | 24/297       |
| 5,302,070 | A | * | 4/1994  | Kameyama| F16B 37/0842 |
|           |   |   |         |         | 411/437      |
| 5,660,513 | A | * | 8/1997  | Shibanushi | F16B 37/0842 |
|           |   |   |         |         | 411/433      |

(Continued)

*Primary Examiner* — Roberta Delisle
(74) *Attorney, Agent, or Firm* — Quinn IP Law

(57) ABSTRACT

Fastening clips, motorized vehicles with fastening clips, and methods for using fastening clips are disclosed. A fastening clip is disclosed for attaching a component to a panel using a threaded fastener. The fastening clip includes a body that inserts into the aperture. The clip body has a flange that seats against one surface of the panel. One or more flexible retaining clips project from the clip body to seat against an opposing panel surface and, with the flange, attach the fastening clip to the panel. Flexible ratchet fingers extend from the clip body into an internal cavity. The ratchet fingers are located on respective sides of the cavity, and are spaced to extend to respective axial positions within the cavity. These ratchet fingers are located and spaced so that only one ratchet finger, at a given time, seats between adjacent threads when the fastener is inserted into the internal cavity.

20 Claims, 3 Drawing Sheets

(56) References Cited

U.S. PATENT DOCUMENTS

| | | | | |
|---|---|---|---|---|
| 5,816,762 A * | 10/1998 | Miura | ............... | F16B 37/0842 |
| | | | | 411/433 |
| 6,070,836 A * | 6/2000 | Battie | .................... | F16L 3/223 |
| | | | | 248/68.1 |
| 6,095,734 A | 8/2000 | Postadan et al. | | |
| 6,598,836 B1 * | 7/2003 | Leon | ................... | F16B 37/0842 |
| | | | | 248/74.1 |
| 7,496,993 B2 | 3/2009 | Kosidlo et al. | | |
| 7,891,151 B2 * | 2/2011 | Sano | ................. | B62D 25/2072 |
| | | | | 296/97.23 |
| 8,579,570 B2 | 11/2013 | Fellows et al. | | |
| 2008/0181748 A1 * | 7/2008 | Rosemann | .......... | F16B 37/0857 |
| | | | | 411/431 |
| 2008/0286066 A1 | 11/2008 | Paquet | | |
| 2010/0111642 A1 * | 5/2010 | Matsuno | ............ | F16B 37/0857 |
| | | | | 411/508 |
| 2011/0044782 A1 | 2/2011 | Lange et al. | | |

\* cited by examiner

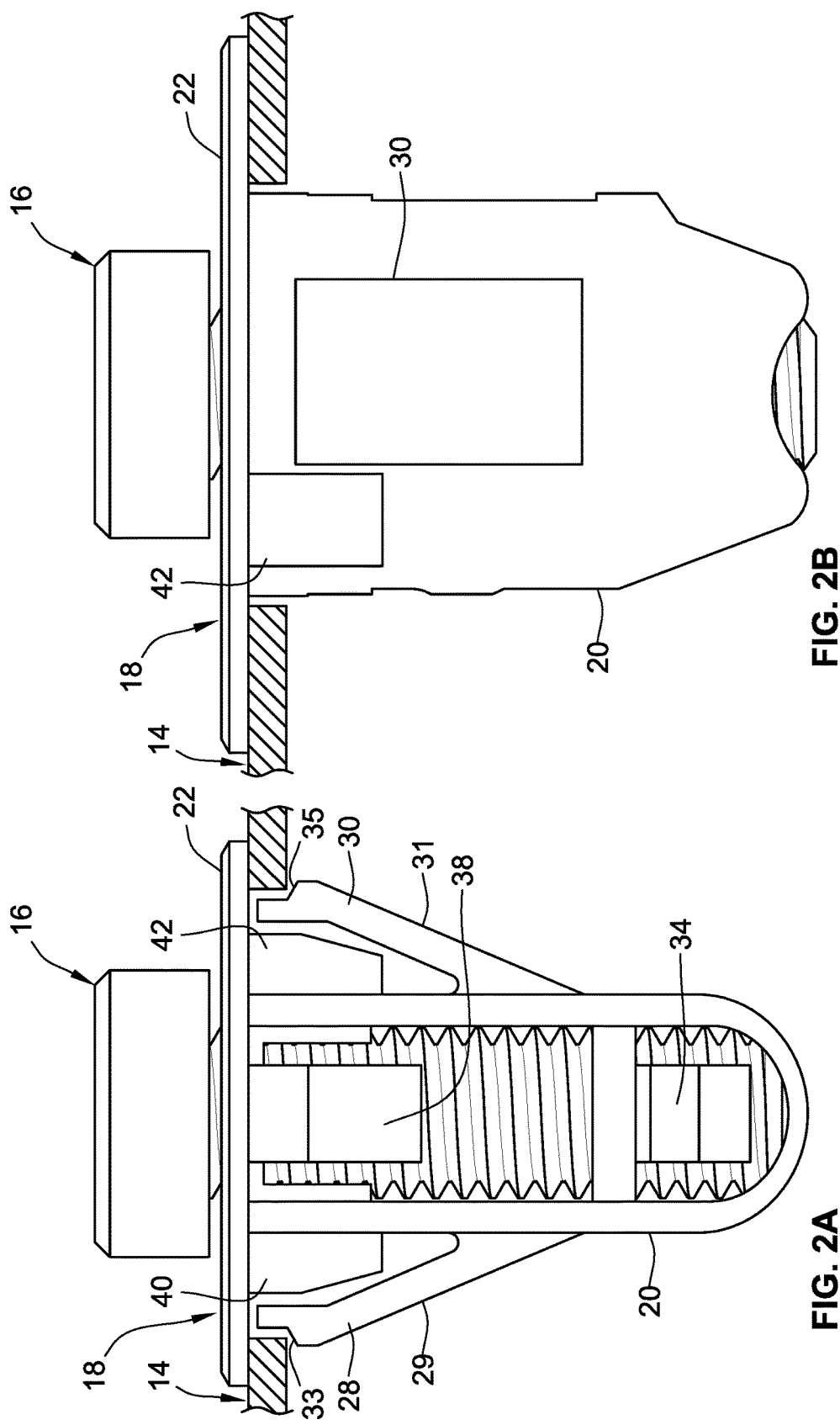

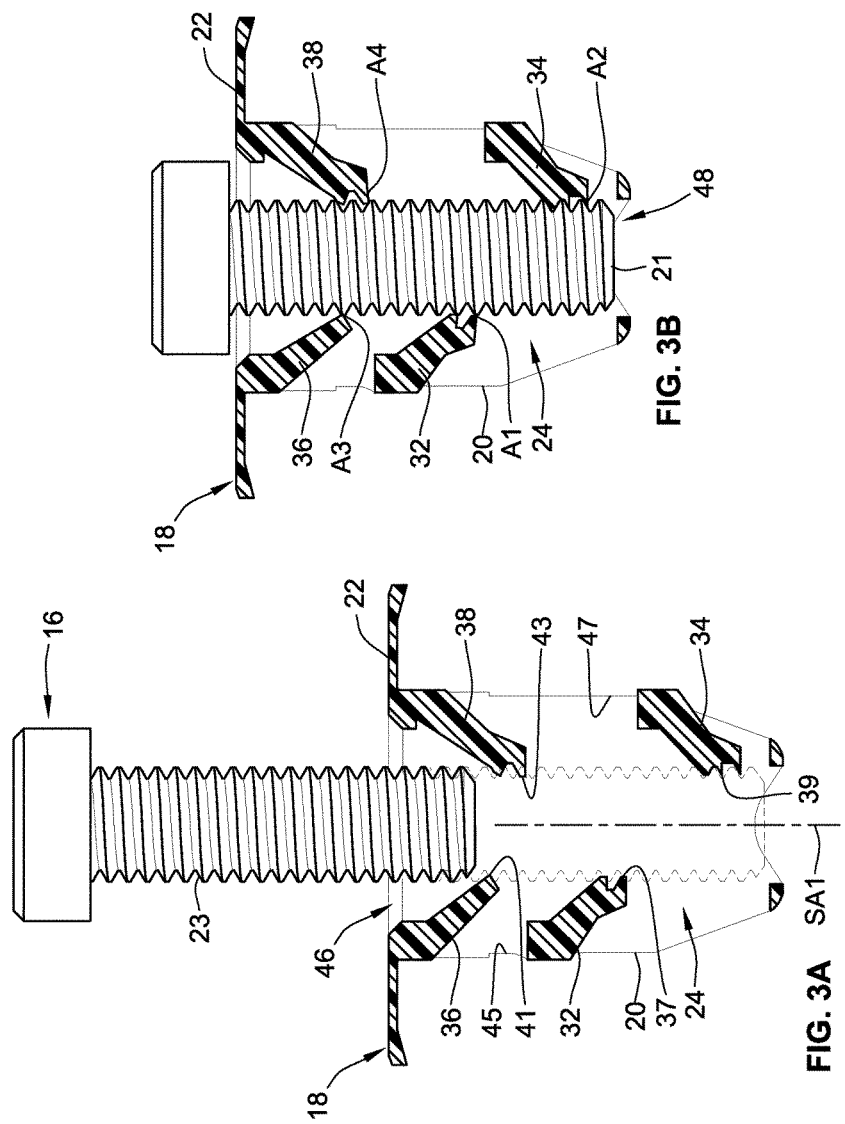

STUD CLIP INSERT FOR PANEL HOLE

TECHNICAL FIELD

The present disclosure relates generally to mechanical fasteners for attaching together one or more components. More particularly, aspects of this disclosure relate to fastening clips that mount within a hole or elongated aperture of a panel and receive a threaded bolt or stud to thereby attach the panel to a component.

BACKGROUND

Many industries, such as the automotive, construction, aviation and manufacturing industries, use mechanical fasteners for attaching one component to another. A diverse range of metal and plastic rivets, clips, and fasteners enable articles to be fastened onto panels or panels to be coupled together. Fastening clips, for example, are designed to insert into or mount onto a panel surface and attach a component to the panel. One such fastening clip is the stud clip insert (or "stud clip" for short), which clips into an aperture of the panel and receives a threaded stud or bolt for attaching the panel to the component. A panel may include any known structure with at least one generally flat segment having opposing mounting surfaces, such as a piece of sheet metal, dry wall, a support pillar or crossbeam, composite board, plate structure, and the like.

Some convention fastening clips require a specially designed, dedicated tool to install the fastening clip to a piece of sheet metal or drywall. Other designs require epoxies or special adhesives for mounting the clip to the panel, while some designs require a separate fastener, such as screws or bolts, to threadably pass through a portion of the clip into the panel for attachment thereto. Further, some bipartite fastening clips comprise a pair of clip components that must be coaxially aligned on opposite sides of the panel and coupled together within an aperture in the panel. Stud clips, by contrast, are typically unitary structures that snap-fit into the panel and, thus, eliminate the need for a nut or washer, specially designed tooling, or adhesives to secure the clip to the panel. Most stud clips are installed from a single side of the panel and, thus, eliminate the need for additional work space and tooling to handle and mount the stud clip.

SUMMARY

Disclosed herein are fastening clips, methods for making and using fastening clips, and motor vehicles with one or more fastening clips. By way of non-limiting example, an improved fastening clip (also referred to hereinbelow as "stud clip insert" or merely "stud clip" for short) is presented that insert mounts within a hole or elongated aperture of a panel structure for receiving a stud, bolt or other threaded fastener to thereby attach a component to the panel. Any recitation to "stud" or "bolt" or "screw," and general modification thereof, can be used interchangeably hereinbelow to generally reference any logically relevant type of threaded fastener. For at least some configurations, the fastening clip has the ability to shift locations within the aperture to accommodate misalignment or manufacturing variations between the component and the panel. Disclosed design features also help to reduce or otherwise eliminate post-installation spring back using a zipper-style ratcheting feature. Other disclosed design features allow for an increased range of stud and bolt lengths due to an added through-hole.

Some design advantages include, for example, faster and less expensive installation by eliminating the need for online tooling, driving nuts, and dedicated adhesives or fasteners for installing the fastening clips. In addition, increased pull forces (e.g., greater than 100 lbs.), improved panel-fastener isolation (e.g., stud isolation to eliminate rust), simplified serviceability (e.g., easily removed and replaced), and cross-platform applicability are additional advantages of at least some of the disclosed design concepts.

Aspects of the present disclosure are directed to fastening clips for panel structures. For example, a fastening clip is disclosed for attaching a component to a panel using a threaded fastener. The panel has opposing first and second surfaces and an aperture that extends through the panel from the first surface to the second surface. The fastening clip includes a clip body that is configured to insert into the aperture. The clip body defines an internal cavity that is configured to receive therein the threaded fastener along a screw axis of the cavity. The clip body has a flange that is configured to seat or otherwise press against the first surface of the panel. One or more flexible retaining clips are coupled to the clip body, projecting outwardly therefrom. The limitation "coupled to," as used hereinbelow, comprises integrally forming or connecting together two separately recited elements. The flexible retaining clip(s) are configured to seat or otherwise press against the second surface and, in cooperation with the flange, attach the clip body to the panel.

Flexible ratchet fingers are coupled to the fastening clip's clip body, extending into the internal cavity to attach the threaded fastener to the fastening clip. The ratchet fingers include first and second ratchet fingers that are located on first and second sides of the internal cavity, respectively, and axially spaced to extend to first and second axial positions relative to the screw axis, respectively. The locations and axial spacing of the ratchet fingers are engineered so that only one of the first and second ratchet fingers, at a given time, seats proximal a root of an adjacent pair of the threads when the threaded fastener is inserted into the internal cavity. This "zipper-style" ratcheting design helps to eliminate spring back after the threaded fastener is inserted into the clip body.

Other aspects of the present disclosure are directed to motor vehicles with fastening clips. The motor vehicle may include any relevant platform, such as passenger vehicles (including internal combustion (IC), hybrid, electric, etc.), industrial vehicles, buses, all-terrain vehicles (ATV), motorcycles, farm equipment, boats, airplanes, etc. In one example, a motor vehicle includes a vehicle body with vehicle structure. This vehicle structure may comprise a sheet metal panel, a support pillar, a crossbeam, a fascia structure, a composite panel, etc., with opposing first and second surfaces and an aperture extending through the panel. The motor vehicle also includes a threaded fastener, a component that is attached or attachable to the threaded fastener, and a fastening clip.

The fastening clip includes a clip body that is inserted into the aperture of the vehicle structure panel. The clip body has an internal cavity receiving therein the threaded fastener along a screw axis of the cavity. The clip body has a flange that seats or otherwise presses against the first surface of the panel. One or more flexible retaining clips are coupled to the clip body, projecting outwardly therefrom. The flexible retaining clip(s) seat or otherwise press against the second surface and, in cooperation with the flange, attach the clip body to the panel. Multiple flexible ratchet fingers are coupled to the clip body, extending inwardly into the internal cavity to attach the threaded fastener to the fastening clip.

First and second ratchet fingers are located on first and second respective sides of the internal cavity. These ratchet fingers are axially spaced to extend to first and second respective axial positions relative to the screw axis. The locations and axial spacing are designed so that, at a given time, only one of the first and second ratchet fingers seats proximal a root of an adjacent pair of the threads with the threaded fastener inserted into the internal cavity.

According to other aspects of the present disclosure, methods of making and methods of using fastening clips are presented. For instance, a method of using a fastening clip, in conjunction with a threaded fastener, to attach a component to a panel is disclosed. The method includes aligning the fastening clip with an aperture in the panel. The fastening clip has a clip body with a flange and one or more flexible retaining clips coupled to and projecting outwardly from the clip body. The clip body has an internal cavity with a screw axis. The method further requires inserting the clip body of the fastening clip into the aperture such that the flange seats against the first surface of the panel and the one or more flexible retaining clips pass through the aperture and then seat against the second surface of the panel. The flange and one or more flexible retaining clips, once seated, cooperatively attach the clip body to the panel. Prior to, contemporaneous with, or after inserting the fastening clip into the panel, the method includes passing the threaded fastener along a screw axis into the internal cavity of the clip body. The fastening clip includes multiple flexible ratchet fingers that are coupled to the clip body, extending into the internal cavity. The ratchet fingers include at least first and second ratchet fingers located on first and second sides of the internal cavity, respectively, and axially spaced to extend to first and second axial positions relative to the screw axis, respectively. The locating and axial spacing of the ratchet fingers are such that only one of the first and second ratchet fingers, at a given time, seats proximal to a root of an adjacent pair of the threads when the threaded fastener is passed into the internal cavity.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the features of this disclosure when taken in connection with the accompanying drawings and the appended claims.

BRIEF DESCRIPTION OF THE DRAWINGS

FIGS. 2A and 2B are front-view and side-view illustrations, respectively, of the representative fastening clip of FIG. 1, shown with the clip body inserted into the panel and the threaded fastener inserted into the clip body.

FIGS. 3A and 3B are side-view illustrations of the representative fastening clip of FIG. 1 taken in partial cross section to better illustrate the insertion of the threaded fastener into the clip body and the corresponding sequential engagement of the ratchet fingers with the threads of the threaded fastener.

Figure 1:
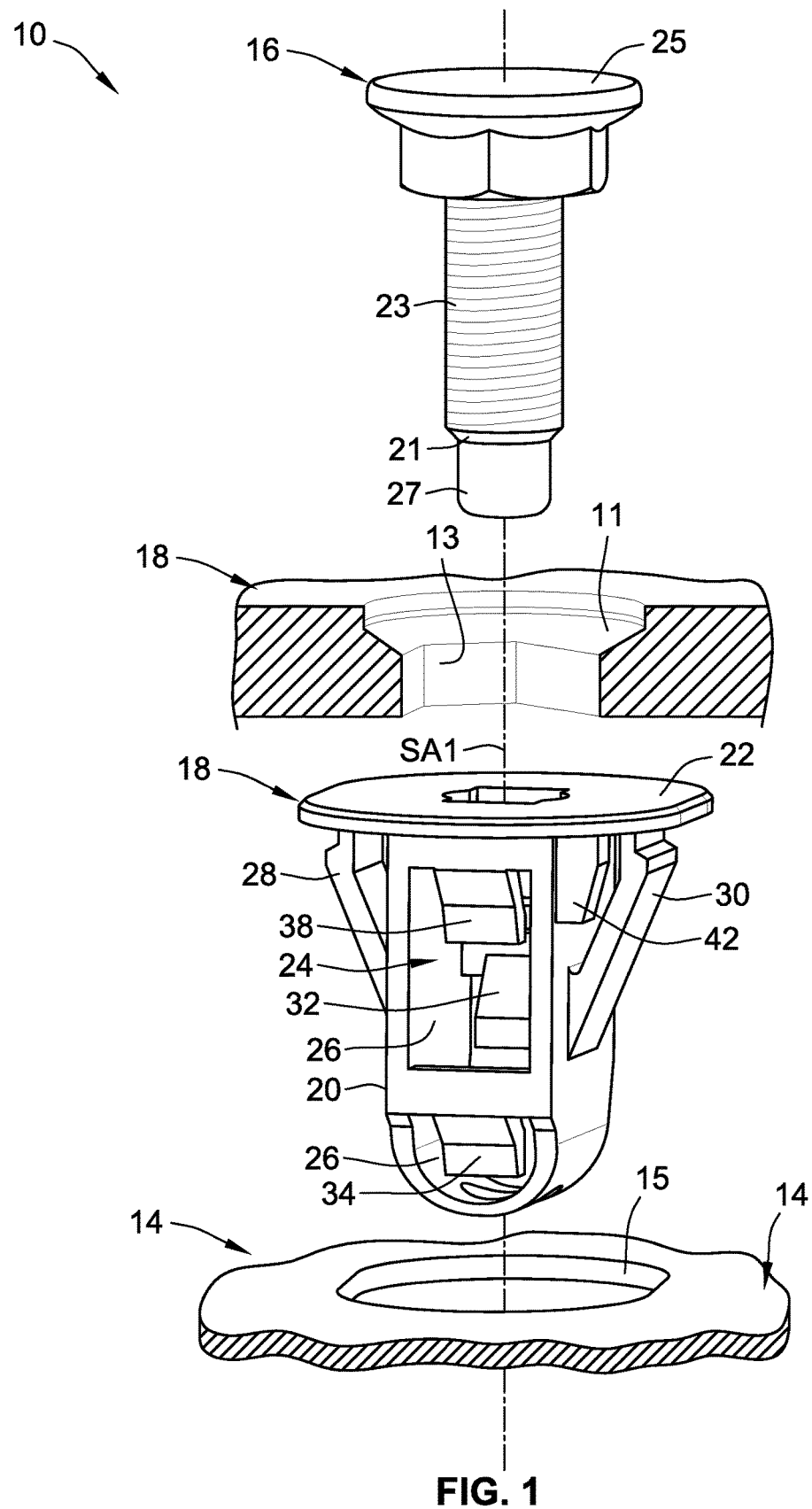
FIG. 1 is an exploded front-view illustration of a representative fastening clip being inserted into a panel for receiving a threaded fastener to attach a component to the panel in accordance with aspects of the present disclosure.

The present disclosure is susceptible to various modifications and alternative forms, and some representative embodiments have been shown by way of example in the drawings and will be described in detail herein. It should be understood, however, that the inventive aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a front-view illustration of a representative mechanical fastening arrangement, designated generally at 10, for mounting a component, indicated at 12, to a panel, identified generally as 14. By way of example, and not limitation, the component 12 is an aerodynamic spoiler or other automotive component that is rigidly mounted onto a deck lid, lift gate, or other vehicle structure 14 of a motor vehicle. A motor vehicle—also referred to herein as "automobile" or "vehicle" for short—is merely an exemplary application with which the inventive aspects of this disclosure can be practiced. In the same vein, the aerodynamic spoiler should also be appreciated as merely an exemplary application of the inventive concepts disclosed herein. As such, it should be understood that the inventive features of the present disclosure can be integrated into other applications and utilized for other manufacturing, assembly or construction processes. Lastly, the drawings presented herein, are not necessarily to scale and are provided purely for instructional purposes. Thus, the specific and relative dimensions shown in the drawings are not to be construed as limiting.

With continuing reference to FIG. 1, the mechanical fastening arrangement 10 has two primary components: a threaded "male" fastener, generally indicated at 16, for mating with a "female" fastening clip, designated generally as 18. The fastening clip 18 is designed to insert into and mount within a complementary panel aperture or hole 15 provided in panel 14. The illustrated segment of panel 14 is substantially flat and has opposing first (upper) and second (lower) surfaces 17 and 19, respectively, with the aperture 15 extending from the first surface 17 to the second surface 19 in FIG. 1. The threaded fastener 16 is designed to pass partially through and seat within a complementary hole 15 of the component 12. Component 12 is then mounted to the panel 14, for example, by lowering the component 12 onto the panel 14 such that the threaded fastener 16 aligns with and inserts into the fastening clip 18, as will be described in detail below. The axis of insertion (also referred to herein as "screw axis") extends longitudinally through the center of the fastening clip 18 and is designated SA1 in FIG. 1.

The threaded fastener 16 is represented in the drawings by a bolt that includes a shank 21 with helically wrapped external threads 23. Located at one end of the shank 21 is a bolt head 25, which may be slotted, raised, hexagonal, countersunk, etc. Located at the opposing end of the shank 21 is an optional necked-down shank tip 27. The threaded fastener 16 can be metal or plastic, which can be coated or painted, while the threads 23 provided thereon can be helical or non-helical and can have varying pitches, angles, diameters, etc., from those which are shown in the drawings. In accord with the illustrated example, the fastening arrangement 10 eliminates the need for a nut or dedicated tooling, such as a wrench or screwdriver, to properly install the threaded fastener 16. Although the component 12 is shown herein as being of molded plastic, the component 12 can be of metal or any suitable material and construction. Likewise, although the panel 14 is described as being a sheet metal panel, the panel 14 can be plastic, composite, etc.

The fastening clip 18 can be fabricated as a single-piece, unitary structure that is integrally formed, for example, from a molded plastic or a precision-tooled metal. While any of an assortment of geometries and dimensions are envisioned, the illustrated fastening clip 18 includes an elongated, tubular clip body 20 having a toroidal flange 22 that extends continuously around the perimeter of a first "upper" end of the body 20. The clip body 20 is shaped and sized to insert into and nest generally coterminously with the aperture 15 of the panel 14, as best seen in FIGS. 2A and 2B. The flange 22 engages the topside first surface 17 to prevent the fastening clip 18 from passing in its entirety through the panel 14. The clip body 20 has a hollow internal cavity 24 for receiving therein the threaded fastener 16. In accord with the illustrated example, the fastening arrangement 10 eliminates the need for internal "female" threads within the fastening clip 18 to mate with the threads 23 of the threaded fastener 16. Put another way, the clip body 20 can be characterized by a lack of internal threads within the internal cavity 24 for threadably engaging the threaded fastener 16. One or more optional lateral openings 26 are provided in the sides of the clip body 20, for example, to facilitate a polymer injection molding process for the manufacture of the fastening clip 18.

Integrally formed with or otherwise positively attached to the clip body 20 are first and second flexible retaining clips 28 and 30, respectively, which project outwardly at an oblique angle from opposing sides of the clip body 20. The undersides of flexible retaining clips 28, 30 provide respective ramp surfaces 29 and 31 that slide against the inner wall of the aperture 15 and cause the retaining clips 28, 30 to be flexed inwardly as the fastening clip 18 is pressed into the aperture 15 of the panel 14. Each flexible retaining clip 28, 30 has a respective notch 33 and 35 at an upper end thereof proximal to the flange 22. Once the clip body 20 passes substantially through the aperture 15 such that the ramp surfaces 29, 31 disengage the aperture's inner wall, the flexible retaining clips 28, 30 will automatically flex outwardly, causing the notches 33, 35 to seat against the panel's underside second surface 19 and, in cooperation with the flange 22 seated against the panel's topside first surface 17, attach the clip body 20 to the panel 14. As best seen in FIG. 2A, the flexible retaining clips 28, 30 are located diametrically opposite to one another on the clip body 20 with respect to the screw axis SA1.

Extending inwardly into the internal cavity 24 of the fastening clip 18 are assorted pawl-like ratchet fingers—four flexible ratchet fingers 32, 34, 36 and 38 illustrated in FIGS. 3A and 3B—that are integrally formed with or otherwise positively attached to the inner periphery of clip body 20. These flexible ratchet fingers 32, 34, 36, 38 extend downwardly at an oblique angle into the internal cavity 24 for ratcheting engagement with the threads 23 of the threaded fastener 16. In the example illustrated in FIG. 3A, each ratchet finger 32, 34, 36, 38 includes at least one and, in some instances, two or three or more asymmetrical teeth 37, 39, 41 and 43. Asymmetrical teeth have a moderate slope on a leading edge and a much steeper slope on an opposing, trailing edge. As the threaded fastener 16 is moved longitudinally (downward in FIGS. 3A and 3B) into the clip body 20 along screw axis SA1, the ratchet fingers 32, 34, 36, 38 are biased outward by the crests of passing threads 23 and flex inwardly into the depression between neighboring threads 23. Each tooth 37, 39, 41, 43 is designed to seat between adjacent flanks of a neighboring pair of the threads 23, cupped against the thread pair's root; when seated, the steep trailing edge of the teeth prevent withdrawal of the threaded fastener 16 from the clip body 20, as seen in FIG. 3B.

With continuing reference to FIGS. 3A and 3B, the first and second ratchet fingers 32, 34 are located diametrically opposite to one another on opposing first and second sides 45 and 47, respectively, of the internal cavity 24. These two fingers 32, 34 are axially spaced or otherwise longitudinally offset to extend to first and second distinct axial positions A1 and A2, respectively, relative to the screw axis SA1. In the same vein, the third and fourth ratchet fingers 36, 38 are respectively located on the first and second sides 45, 47 of the internal cavity 24, and axially spaced to extend to third and fourth axial positions A3 and A4, respectively, relative to the screw axis SA1. The location and axial spacing of the ratchet fingers is engineered such that, at any given time, only one of the first and second ratchet fingers 32, 34 and only one of the third and fourth ratchet fingers 36, 38 seats within a root of an adjacent pair of the threads when the threaded fastener 16 is inserted into the internal cavity 24 of the clip body 20. According to the example illustrated in FIG. 3B, the second and fourth ratchet fingers 34, 38 are shown seated between adjacent flanks of neighboring threads 23, cupped against the thread pair's root, locking the threaded fastener 16 to the fastening clip 18. Synchronously, when these ratchet fingers 34, 38 are fully seated, the first and third ratchet fingers 32, 36 are unseated by the threaded fastener 16, deflected outwardly by respective flanks of the threads 23. Conversely, when the first and third ratchet fingers 32, 36 are fully seated between the flanks of neighboring threads 23, the second and fourth ratchet fingers 34, 38 are unseated by the threaded fastener 16. In instances where the threaded fastener 16 attempts to unintentionally translate upwardly in FIG. 3B (known as "spring back"), the unseated ratchet fingers will then fully seat to prevent unwanted backward motion.

A pair of flexible biasing tabs 40 and 42 are integrally formed with or otherwise positively attached to the outer periphery of clip body 20. Positioned adjacent to and circumferentially spaced from the flexible retaining clips 28, 30, the flexible biasing tabs 40, 42 are located diametrically opposite one another on the clip body 20 with respect to the screw axis SA1 of the internal cavity 24. Each flexible biasing tab 40, 42 extends circumferentially about the clip body 20, and flexes radially toward and away from the body 20. These biasing tabs 40, 42 project outwardly from the clip body 20 to engage the inner wall of the aperture 15 upon insertion of the fastening clip 18 into the panel; the tabs flex against the inner wall and cooperatively bias the fastening clip 18 to a centered position within the aperture 15.

Turning back to FIG. 3A, the internal cavity 24 includes a first (entrance) opening 46 at a first (top) end of the clip body 20. A second (bottom) end of the clip body 20, opposite that of the first end, has a second (exit) opening 48. Both of the openings 46, 48 are shaped and sized to pass therethrough the threaded shank 21 of the threaded fastener 21. With these features, the fastening clip 18 can accommodate an increased range of stud and bolt lengths due to the additional through-hole 48 at the bottom end of the clip body 20.

To attach the component 12 to the panel 14 using the threaded fastener 16 and fastening clip 18, the body 20 of the fastening clip 18 is generally coaxially aligned with the aperture 15 of the panel 14. The clip body 20 is then pressed or otherwise inserted, either manually or through an automated process, into the aperture 15 until the flange 22 seats against the first (top) surface 17 of the panel 14 and the flexible retaining clips 28, 30 pass through the aperture 15 and seat the notches 33, 35 against the second (underside) surface of the panel 14. The flange 22 and flexible retaining clips 28, 30, once seated, cooperatively attach the fastening clip 18 to the panel 14.

Prior to, contemporaneous with, or after mounting the fastening clip 18 to the panel 14, the shank 21 of the threaded fastener 16 is passed through the complementary hole 13 of the component 12 until the fastener's head 25 presses against a pocket 11. For applications where the threaded fastener 16 is a stud, the foregoing step is replaced with threadably engaging a threaded top end of the stud with an internally threaded slot in the component 12. Once the threaded fastener 16 and component 12 are mechanically coupled, the component 12 is positioned to axially align the threaded fastener 16 with the screw axis SA1 of the fastening clip 18. Threaded fastener 16 is then translated rectilinearly along the screw axis SA1 into the internal cavity 24 of the clip body 20. The assorted flexible ratchet fingers 32, 34, 36, 38 that extend into the internal cavity 24 ratchet against the threads 23 of the fastener 16, as described above. When the threaded shank 21 is fully inserted into the clip body 20, as seen in FIG. 3B, at least one or, for at least some desired configurations, a subset of the pawl-like ratchet fingers 32, 34, 36, 38 seats within adjacent threads and locks the threaded fastener 16 to the fastening clip 18.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and aspects.

What is claimed:

1. A fastening clip for attaching a component to a panel using a threaded fastener with threads, the panel having opposing first and second surfaces and an aperture extending from the first surface to the second surface, the fastening clip comprising:
    a clip body configured to insert into the aperture, the clip body defining an internal cavity configured to receive therein the threaded fastener along a screw axis of the cavity, the clip body having a flange configured to press against the first surface of the panel;
    one or more flexible retaining clips coupled to the clip body and projecting outwardly therefrom, the one or more flexible retaining clips being configured to press against the second surface and, in cooperation with the flange, attach the clip body to the panel; and
    a plurality of flexible ratchet fingers coupled to the clip body and extending into the internal cavity to attach the threaded fastener to the fastening clip, the plurality of ratchet fingers including first and second ratchet fingers located on first and second sides of the internal cavity, respectively, and axially spaced to extend to first and second axial positions relative to the screw axis, respectively, the locations and axial spacing being configured such that only one of the first and second ratchet fingers, at a given time, seats proximal a root of an adjacent pair of the threads when the threaded fastener is inserted into the internal cavity.

2. The fastening clip of claim 1, wherein, when the first ratchet finger is seated within a root of an adjacent pair of the threads, the second ratchet finger is deflected outwardly by a flank of one of the threads.

3. The fastening clip of claim 1, wherein the plurality of ratchet fingers further includes third and fourth ratchet fingers located on the first and second sides of the internal cavity, respectively, and axially spaced to extend to third and fourth axial positions relative to the screw axis, respectively, the locating and axial spacing being such that only one of the third and fourth ratchet fingers, at a given time, seats within a root of an adjacent pair of the threads when the threaded fastener is inserted into the internal cavity of the clip body.

4. The fastening clip of claim 1, wherein the internal cavity includes first and second openings at opposing ends of the clip body, both of the openings being configured to pass therethrough a threaded shank of the threaded fastener.

5. The fastening clip of claim 1, wherein the one or more flexible retaining clips includes first and second flexible retaining clips located diametrically opposite one another on the clip body with respect to the screw axis of the internal cavity.

6. The fastening clip of claim 5, wherein each of the flexible retaining clips includes a ramp surface configured to engage an inner sidewall of the aperture and thereby cause the flexible retaining clips to flex inwardly when the clip body is inserted into the aperture of the panel.

7. The fastening clip of claim 1, further comprising a plurality of flexible biasing tabs coupled to the clip body and projecting outwardly therefrom, the flexible biasing tabs being configured to engage walls of the aperture and bias the clip body to a centered position within the aperture upon insertion of the clip body into the aperture of the panel.

8. The fastening clip of claim 7, wherein the flexible biasing tabs are located diametrically opposite one another on the clip body with respect to the screw axis of the internal cavity.

9. The fastening clip of claim 1, wherein the clip body is elongated and tubular with one or more side openings.

10. The fastening clip of claim 1, wherein each of the ratchet fingers includes one or more teeth configured for ratcheting engagement with the threads of the threaded fastener.

11. The fastening clip of claim 1, wherein the clip body is characterized by a lack of internal threads within the internal cavity for threadably engaging the threaded fastener.

12. The fastening clip of claim 1, wherein the clip body, the one or more flexible retaining clips and the plurality of flexible ratchet fingers are integrally formed as a single-piece unitary structure.

13. A motor vehicle, comprising:
a vehicle body with vehicle structure including a panel, the panel having first and second opposing surfaces and an aperture extending through the panel;
a threaded fastener with threads;
a component attached to the threaded fastener; and
a fastening clip including:
a clip body inserted into the aperture of the panel, the clip body defining an internal cavity receiving therein the threaded fastener along a screw axis of the cavity, the clip body having a flange seated on the first surface of the panel;
one or more flexible retaining clips coupled to the clip body and projecting outwardly therefrom, the one or more flexible retaining clips being seated adjacent the second surface and, in cooperation with the flange, attaching the clip body to the panel; and
a plurality of flexible ratchet fingers coupled to the clip body and extending into the internal cavity to attach the threaded fastener to the fastening clip, the plurality of ratchet fingers including first and second ratchet fingers located on first and second opposing sides of the internal cavity, respectively, and axially spaced to extend to first and second distinct axial positions relative to the screw axis, respectively, the locations and axial spacing being configured such that only one of the first and second ratchet fingers is seated proximal a root of an adjacent pair of the threads with the threaded fastener inserted into the internal cavity.

14. A method of using a fastening clip to attach a component to a panel using a threaded fastener, the threaded fastener being attachable to the component, and the panel having opposing first and second surfaces and an aperture extending from the first surface to the second surface, the method comprising:
aligning the fastening clip with the aperture of the panel, the fastening clip having a clip body with a flange and one or more flexible retaining clips coupled to and projecting outwardly from the clip body, the clip body defining an internal cavity with a screw axis;

inserting the clip body of the fastening clip into the aperture such that the flange seats against the first surface of the panel and the one or more flexible retaining clips pass through the aperture and seat against the second surface of the panel, the flange and one or more flexible retaining clips, once seated, cooperatively attaching the clip body to the panel; and
passing the threaded fastener along the screw axis into the internal cavity of the clip body, the fastening clip including a plurality of flexible ratchet fingers coupled to the clip body and extending into the internal cavity, the plurality of ratchet fingers including first and second ratchet fingers located on first and second sides of the internal cavity, respectively, and axially spaced to extend to first and second axial positions relative to the screw axis, respectively, the locating and axial spacing being configured such that only one of the first and second ratchet fingers, at a given time, seats within a root of an adjacent pair of the threads when the threaded fastener is passed into the internal cavity.

15. The method of claim 14, wherein, when the first ratchet finger is seated within a root of an adjacent pair of the threads, the second ratchet finger is deflected outwardly by a flank of one of the threads.

16. The method of claim 14, wherein the plurality of ratchet fingers further includes third and fourth ratchet fingers located on the first and second sides of the internal cavity, respectively, and axially spaced to extend to third and fourth axial positions relative to the screw axis, respectively, the locating and axial spacing being such that only one of the third and fourth ratchet fingers, at a given time, seats within a root of an adjacent pair of the threads when the threaded fastener is inserted into the internal cavity of the clip body.

17. The method of claim 14, wherein the internal cavity includes first and second openings at opposing ends of the clip body, both of the openings being configured to pass therethrough a threaded shank of the threaded fastener.

18. The method of claim 14, wherein the fastening clip further comprises a plurality of flexible biasing tabs coupled to the clip body and projecting outwardly therefrom, the flexible biasing tabs engaging walls of the aperture and biasing the clip body to a centered position within the aperture upon insertion of the clip body into the aperture of the panel.

19. The method of claim 14, wherein each of the ratchet fingers includes one or more teeth configured for ratcheting engagement with the threads of the threaded fastener.

20. The method of claim 14, wherein the clip body, the one or more flexible retaining clips and the plurality of flexible ratchet fingers are integrally formed as a single-piece unitary structure.

* * * * *